Dec. 2, 1930.    E. MATTHEWS    1,783,193

SNUBBER FOR AUTOMOBILES

Filed March 26, 1928

Inventor
Edward Matthews.
By  H. J. O'Brien
Attorney

Patented Dec. 2, 1930

1,783,193

UNITED STATES PATENT OFFICE

EDWARD MATTHEWS, OF DENVER, COLORADO

SNUBBER FOR AUTOMOBILES

Application filed March 26, 1928. Serial No. 264,747.

This invention relates to improvements in snubbers for automobiles.

It is well known that when automobiles are provided with spring suspensions that yield readily to shocks, due to the irregularities of the road surface, that the upward throw of the body has a tendency to raise the occupant from the seat and to subject him to great discomfort.

In order to limit the intensity of the rebound, various devices have been invented and applied to automobile springs, whose function it is to exert a snubbing action on the spring and to cause it to gradually come to a stop in such a way that objects resting on the seats will not be thrown away from the seat surface.

It is the object of this invention to produce a snubbing device of a very simple construction that can be cheaply made and which can be easily and quickly applied to the springs of any automobile.

My invention, briefly described, consists in an arcuate auxiliary spring which is somewhat shorter than the distance from the eyelet at the end of the spring to the center point of suspension and which is secured to the spring in such a manner that the concave surface of the auxiliary spring will face the master leaf of the spring to which it is attached. Means is provided for holding the center of the auxiliary spring at a fixed distance from the master leaf and resilient cushions are interposed between the ends of the auxiliary spring and the master leaf. The auxiliary spring is put into place in such a manner that it will not become loose if the spring to which it is attached is bent to its maximum permissible extent and which therefore exerts a force tending to bend the spring in the same direction as the load. After a spring has been flexed and returns towards its normal position the auxiliary springs opposes a force which tends to counteract the force of the flexed spring and which therefore serves to bring it to a more gradual stop, thereby diminishing the intensity of the upward throw and exerting a snubbing action.

Having thus described the invention briefly, the same will now be described in detail and reference for this purpose will be had to the accompanying drawing in which the preferred embodiment thereof has been illustrated and in which:

Figure 1:
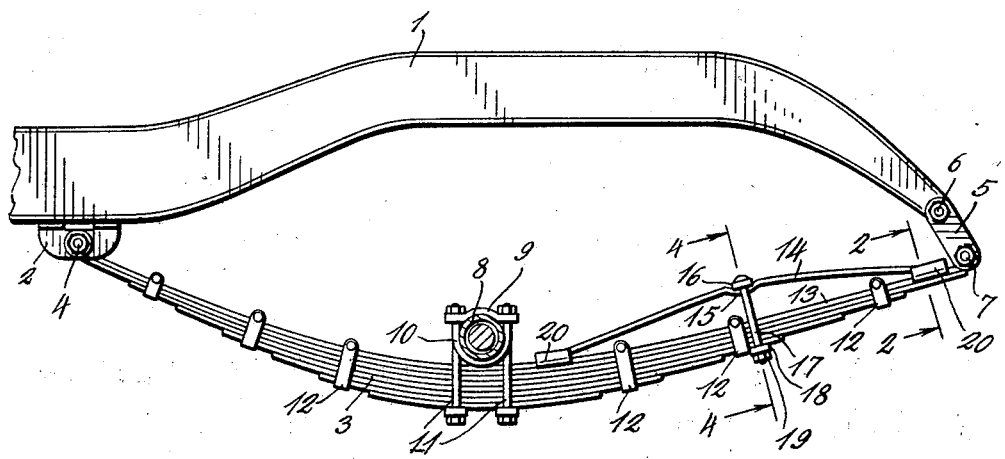
Fig. 1 shows a side elevation of a portion of an automobile chassis frame to which a semielliptical spring is attached in the usual manner.
Figure 2:
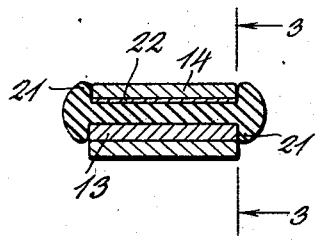
Fig. 2 is a section taken on line 2—2, Fig. 1.
Figure 3:
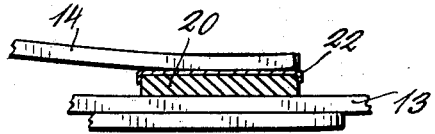
Fig. 3 is a section taken on line 3—3, Fig. 2.
Figure 4:
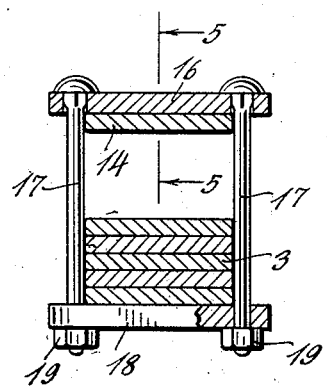
Fig. 4 is a section taken on line 4—4, Fig. 1.
Figure 5:
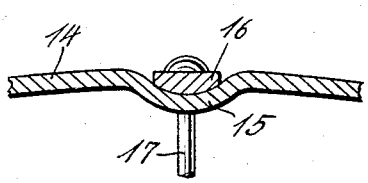
Fig. 5 is a section taken on line 5—5, Fig. 4.

In the drawing numeral 1 indicates a chassis frame which is provided with spaced brackets 2 to which one end of an elliptical spring 3 is secured by means of a bolt 4. The other end of the spring is attached to the extreme end of the frame member 1 by means of links 5, the upper ends of which are pivotally attached to the frame by means of a bolt 6 and the lower ends of which are connected to the spring by means of a bolt 7. Numeral 8 represents the axle housing to which the supporting bracket 9 is clamped by means of U-bolts 10. Spring 3 is secured to the bracket 9 by means of bolts 11. The load is, of course, supported by the chassis frame and the axle housing 8 is supported by the wheels of the automobile, not shown. When the wheels pass over an elevation in the road or fall into a depression, the shock due to the momentum of the load or to its inertia will be taken up by the yielding of spring 3 in a manner well understood. After spring 3 has been straightened to some extent, due to the action of the parts in passing over inequalities of the road surface, it will immediately tend to assume its normal position and this will impart to the weight supported by the springs a momentum which tends to carry the parts above the normal position of the spring and this upward movement will be opposed by the force required to flex the spring in an upward direction. In order to make all the leaves of the multiple leaf spring effective to resist the upward throw, they have been connected by means of clamps 12, which ties them together so that the upward throw will be distributed over all instead of being borne exclusively by the master leaf 13. It is evident that if a resilient member is attached to the spring in such a manner, that it will oppose a gradually increasing force to the upward flexure of the spring that it will serve to bring the parts to a gradual stop before the upward throw has assumed sufficient proportions to flex the main spring above its normal position and therefore the parts will be gradually brought to a stop. For the purpose of producing such a force, I have provided an auxiliary spring 14 which is slightly curved in a longitudinal direction. The center portion of this spring has a transverse depression 15 in which the curved transverse member 16 is located. Bolts 17 pass through the ends of member 16 and pass through a bar 18 located underneath the multiple leaf spring. Nuts 19 serve to hold the parts in assembled position. Resilient spacers 20 are provided between the ends of the auxiliary spring 14 and the upper surface of the master leaf 13 in the manner shown in Figs. 2 and 3. These spacers are preferably formed from rubber composition of such a nature that they will yield slightly when subjected to pressure. These spacers are provided on both sides with spaced flanges 21 that engage the edges of the master leaf and the edges of the auxiary spring 14, so as to prevent the latter from tipping transversely with respect to the spring to which it is attached. A thin steel plate 22 is preferably located between the end of the auxiliary spring and the resilient spacer so as to take up the wear due to the relative longitudinal movement which must necessarily take place as the parts are flexed. By means of the bolt 17 and the nuts 19, the force exerted by the auxiliary spring 14 can be adjusted to any extent found necessary. It is apparent that when the spring 3 is straightened due to the action of the load, that this straightening action is assisted somewhat by the force exerted by the auxiliary spring and that when the main spring is moving back to normal position, it will be opposed by the force exerted by the auxiliary spring and that this is adjusted so that it will prevent the sudden upward throw which usually accompanies a rebound of a spring of this type. The principal action of this auxiliary spring is due to its flexure and there is very little relative longitudinal movement between the auxiliary spring and the master leaf, but such movement is permitted to take place on the plates 22. The resilient spacers 20 serve to prevent chatter and as they are resilient, they also yield somewhat during the operation and in this manner modify to some extent the functioning of the device above described.

From the above it will be apparent that I have produced a very simple snubber that can be quickly applied to any automobile spring and which will very effectively prevent the objectionable sudden stopping of the parts during the rebound of the spring and which will therefore add to the comfort of the occupants.

Having described my invention what is claimed as new is:

1. A snubber for preventing excessive rebound of semielliptical multiple leaf springs provided with a master leaf, comprising an arched auxiliary spring provided with a shallow transverse depression on its convex side, means for securing the arched spring to the master leaf of the multiple leaf spring, said means comprising a bar located in the depression, and a rubber pad between the ends of the arched spring and the master leaf, said pads having each side provided with spaced parallel flanges adapted to embrace the sides of the master leaf and the sides of the end portions of the arched spring.

2. A snubber for preventing the excessive rebound of a multiple leaf spring that is provided with a master leaf, comprising an arched auxiliary spring adapted to be secured to the multiple leaf spring with its concave side towards the master leaf, means for holding the center of the arched auxiliary spring a fixed predetermined distance from the master leaf, resilient spacers between the ends of the auxiliary spring and the master leaf, said spacers having each side provided with parallel flanges for engaging the edges of the master leaf and of the arched spring and a metal plate separating the ends of the arched spring from the material of which the spacer is formed.

In testimony whereof I affix my signature.

EDWARD MATTHEWS.